R. KNOX.
AUTOMOBILE CHAIN.
APPLICATION FILED MAR. 7, 1917.
1,255,615.
Patented Feb. 5, 1918.
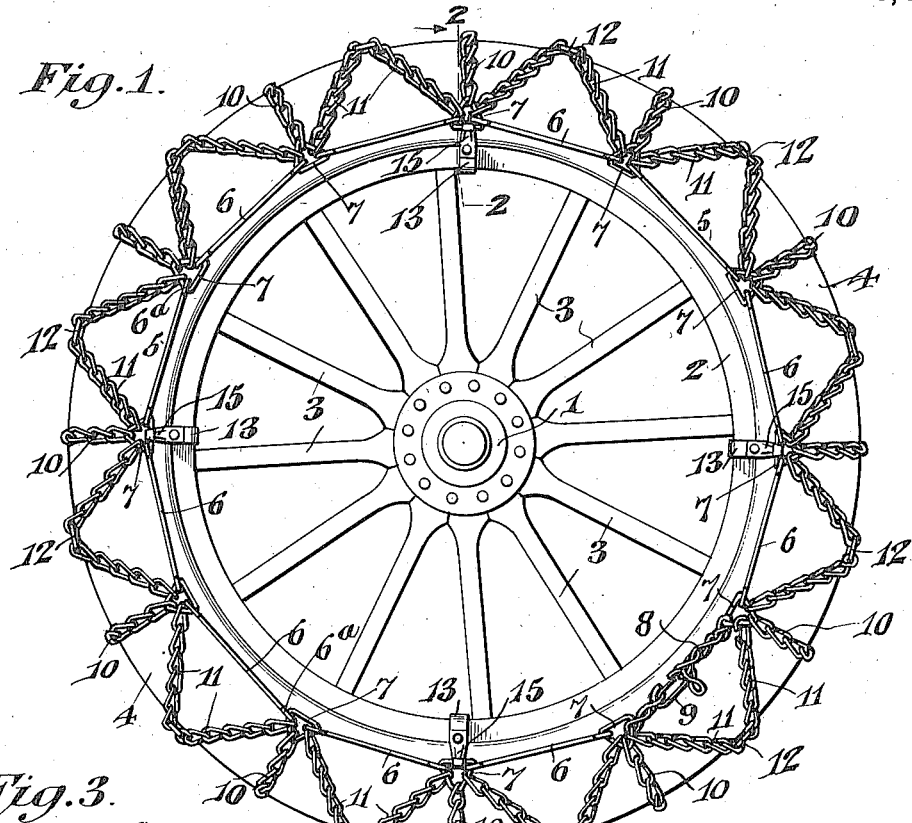
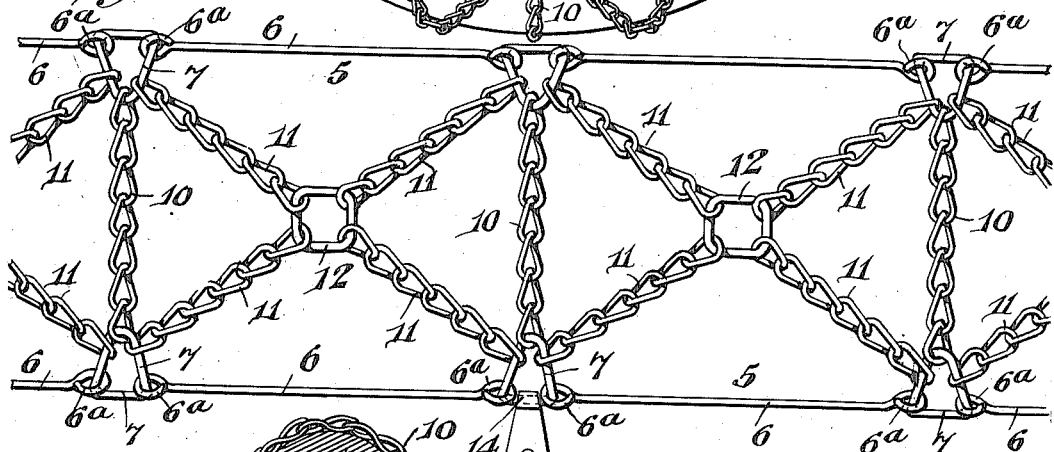
WITNESSES
Jas. K. McCathan
Chas. H. Kesler
INVENTOR
R. Knox,
BY
E. G. Siggers
ATTORNEY

UNITED STATES PATENT OFFICE.

RALPH KNOX, OF NEW BLOOMFIELD, MISSOURI.

AUTOMOBILE-CHAIN.

1,255,615.  Specification of Letters Patent.  Patented Feb. 5, 1918.

Application filed March 7, 1917. Serial No. 153,076.

*To all whom it may concern:*

Be it known that I, RALPH KNOX, a citizen of the United States, residing at New Bloomfield, in the county of Callaway and State of Missouri, have invented a new and useful Automobile-Chain, of which the following is a specification.

This invention relates to automobile chains.

An object of the invention is to provide a construction in which the anti-skid elements or chain sections are arranged in triangular relation with reference to the tread, there being a plurality of these triangularly arranged sections around the periphery of the tire.

Another object of the invention is to connect these anti-skid elements to each other and to the side members or chains by means of links of such construction that crawling or slipping of the same relatively to each other will be prevented.

Another object of the invention is to provide a special construction of side members or chains which will not easily rust, break, or become interlinked or entangled when not in use.

Another object of the invention is to improve the general construction of devices of this nature whereby side slipping will be prevented and greater gripping power obtained.

Another object of the invention is to provide a construction which can be placed easily and quickly in position on the tire and will be securely held thereon when in use.

In the accompanying drawing I have illustrated one embodiment of my invention in which:

Figure 1 is a side elevation of an automobile wheel illustrating the application of the invention thereto.

Fig. 2 is a cross sectional view on the line 2—2 of Fig. 1.

Fig. 3 is a plan view of a section of my chain.

The form of chain here illustrated is shown applied to a wheel of standard construction having a hub 1 and a rim or felly 2 connected to the hub by means of radial spokes 3. To the rim or felly is attached the usual pneumatic tire 4.

My device comprises side members or chains 5 arranged on opposite sides of the wheel adjacent to the rim and extending parallel with the same. Each of the side chains comprises a plurality of straight plain rods 6 which are connected to each other by means of triangular links 7. The ends of each rod 6 are provided with suitable eyes $6^a$ which engage corners of the triangular links to which they are connected whereby the rod is held securely in place against slipping. The side chains, on account of the comparative length of the rods, do not easily become entangled or interlinked. Furthermore, the rods do not carry mud, as link chains do, and the result is, that they do not rust as easily and are more lasting and durable. One free end of each side member is provided with a chain 8, while the opposite free end thereof has a snap hook 9 constituting a fastening device adapted to adjustably engage the various links of the chain 8, whereby the side members can be adjustably tightened to cause the anti-skid elements to closely engage the tire.

The triangular links of the side chains or members are arranged in pairs on opposite sides of the wheel and in the same transverse vertical plane. Connecting the adjacent corners of each pair of triangular links is a chain section 10 extending transversely across the tread of the wheel and at right angles thereto.

Arranged between adjacent transversely extending chain sections 10 and the side members 5 are four diagonally extending chain sections 11 attached at their outer ends to the triangular links to which the adjacent sections 10 are connected and at their inner ends to a square link 12 located centrally between the transverse chain sections 10 and the side members 5. The outer ends of the sections 11 engage the triangular links at the corners thereof to which the ends of the transverse sections 10 are connected and their inner ends engage the link 12 at its corners. This arrangement prevents the slipping and crawling of the chain sections relatively to each other when in use. In this connection, it should be noticed that each transverse chain section 10 constitutes the base of a triangle or triangles of which the chain sections 11 constitute the sides. The diagonal sections 11 prevent lateral skidding of the wheel and firmly grip the ground to insure the forward movement of the wheel as it rotates and the transverse sections 10 also cause the wheel to securely grip the ground. The chain sections 10 also prevent undue spreading of the side members 5 and hold them in parallel relation.

In order to fasten the chain to the wheel I have provided chain fasteners or holders 13 each comprising a spring-steel, substantially U-shaped member embracing the inside of the felly, pivoted at one end 14 to the inner side of one of the triangular links and having at its opposite end a snap 15 adapted to detachably engage a side of the corresponding link at the opposite side of the wheel. In the present embodiment of the invention I have shown four of these holders, but it is to be understood that the number may be varied. It is preferable however, in applying the holder to place it in front of and adjacent to a spoke, as shown in Fig. 1, the wheel rotating clockwise, looking at Fig. 1. Each holder 13 upon its inner side is provided with a leather lining 16, which is interposed between it and the felly. The holders effectively prevent the creeping of the chain around the wheel and improve the gripping power thereof.

It will be seen from the showing here made that I have provided a construction which will effectively prevent skidding of the automobile and which will efficiently grip the ground. The chain is very easily applied and removed by releasing the holders and unfastening the snaps 9.

While I have shown and described one embodiment of my invention, it is to be understood that I do not desire to be limited to the details of construction herein shown and described for obvious modifications, such as come within the scope of the appended claims, will be apparent to anyone skilled in the art.

What is claimed is:—

1. In an automobile chain, side securing elements, each comprising a plurality of rigid rods, and triangular shaped unbroken links loosely connected to the adjacent ends of the rods, and clamping members hinged to diametrically opposed links between the points of connection of the rods therewith at one side and detachably engageable with companion links at the other side, and tread chains connected to the links.

2. In an automobile chain, side securing elements, each comprising a plurality of rigid rods, and triangular shaped unbroken links loosely connected to the adjacent ends of the rods, and clamping members hinged to diametrically opposed links between the points of connection of the rods therewith at one side and detachably engageable with companion links at the other side, tread chains connected to the links, and snap fasteners on each clamping member for the detachable engagement thereof.

In testimony that I claim the foregoing as my own, I have hereto affixed my signature in the presence of two witnesses.

RALPH KNOX.

Witnesses:
 BESSIE BOYD,
 JOHN B. SCHOLL.